UNITED STATES PATENT OFFICE.

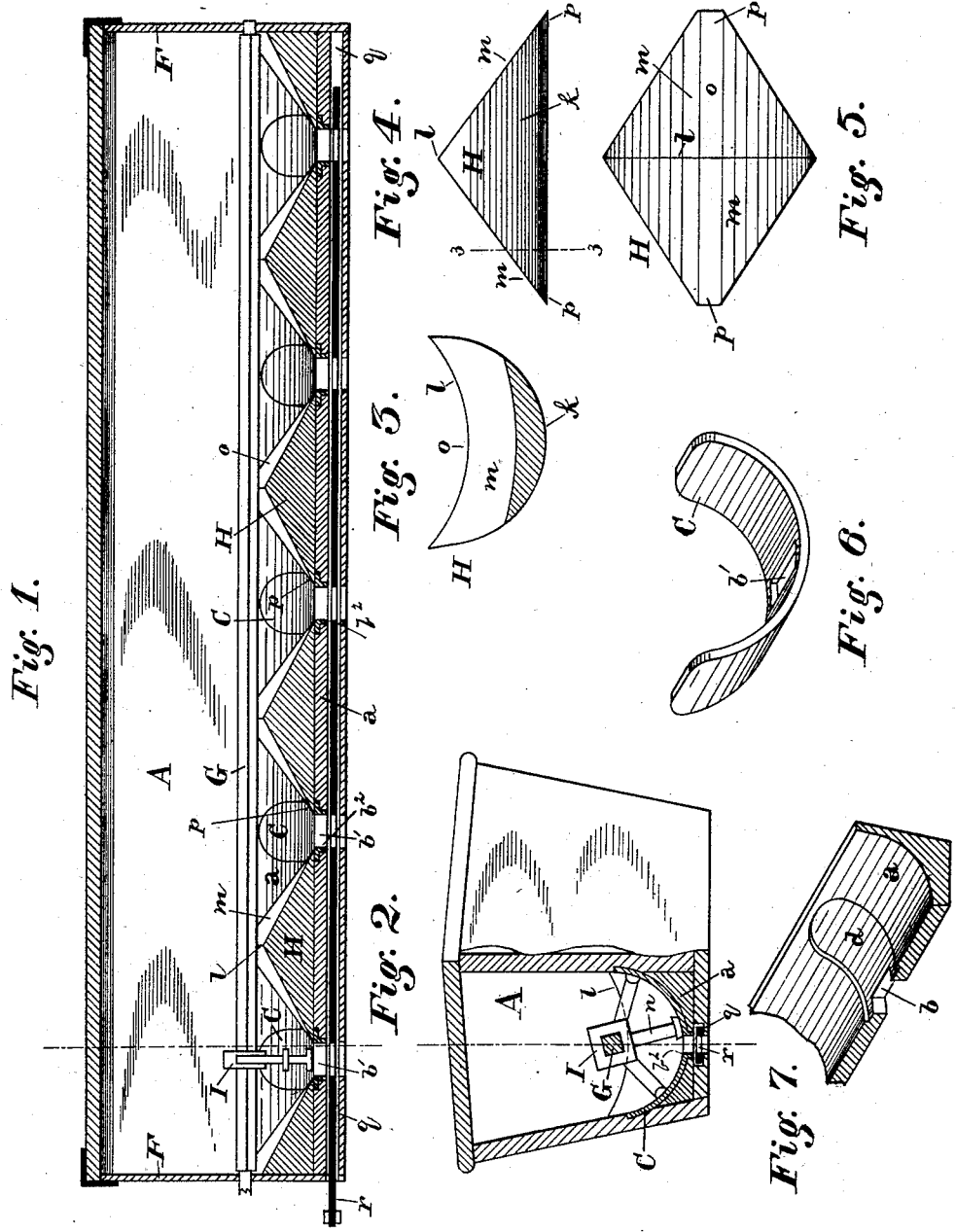

THOMAS R. CRANE, OF HEATHSVILLE, VIRGINIA.

HOPPER FOR FERTILIZER-DRILLS.

SPECIFICATION forming part of Letters Patent No. 374,455, dated December 6, 1887.

Application filed October 7, 1887. Serial No. 251,733. (No model.)

*To all whom it may concern:*

Be it known that I, THOMAS R. CRANE, a citizen of the United States, residing at Heathsville, in the county of Northumberland and State of Virginia, have invented certain new and useful Improvements in Hoppers for Fertilizer-Drills, of which the following is a specification.

This invention relates to improvements in hoppers for fertilizer-drills, and is illustrated in the drawings and set forth in the claims.

Referring to the drawings, Figure 1 is a longitudinal vertical section of the hopper. Fig. 2 is a vertical cross-section of the hopper on line 2. Fig. 3 is an end view of the inclined bottom block, a portion being shown in section on the line 3. Fig. 4 is a side view of the inclined bottom block. Fig. 5 is a top view of same. Fig. 6 is a view of the curved feed-plate, and is the form the plate would have when made of glass. Fig. 7 is a view showing one recess in the concaved bottom.

The hopper A has a concaved trough-shaped wood bottom, $a$, with feed-openings $b$ at intervals along its length. Where each opening occurs the upper surface of the bottom has a recess, $d$, to receive a curved feed-plate, C, which is made of some material that will resist the action of acid. For this purpose I use glass or some of the well-known anti-acid metal compositions. The said curved feed-plate C is seated in the recess $d$, which it fits snugly, and the top surface of the feed-plate and bottom $a$ are flush. The feed-plate has a feed-discharge hole $b'$, which has a position coincident with the feed-opening $b$ in the bottom $a$.

In Figs. 1 and 2 the curved feed-plate C is shown as having a downward flange, $b^2$, around the feed-discharge hole. A rock-shaft, G, extends through the hopper lengthwise, and has suitable bearings in the ends F. This rock-shaft carries a number of agitators, I, which have prongs $n$, that vibrate or swing crosswise of the hopper. An agitator is located directly above each curved feed-plate C. By this construction of anti-acid curved feed-plate C, seated flush in a recess, $d$, in the hopper-bottom, fertilizers which have components that have been treated with acid will not affect the material of the hopper-bottom nor the parts immediately about the feed-opening.

In addition to the curved feed-plate C, I employ inclined bottom-blocks H, and place them between each two feed-holes, $b'$. The blocks H have a rounded bottom, $k$, which fits the concavity of the hopper-bottom $a$, and on top each block has a high central cross-ridge, $l$, and two inclined surfaces, $m$, which incline from the cross-ridge downward in opposite directions. The inclined surfaces $m$ are hollowed or concaved, as at $o$, and thereby serve better to direct the fertilizer to the feed-holes $b'$. The inclined bottom-blocks H are placed in upon the hopper-bottom $a$, and their ends $p$ overlap on top of the curved feed-plates C, and terminate at the feed-holes $b'$, and are secured in position in any suitable way. The inclined bottom-blocks confine the curved feed-plates to their recesses, and also cause the fertilizer to be directed to the feed-holes.

One feature of my invention is providing the hopper-bottom with glass plates having feed-holes.

Below the hopper-bottom is a guideway, $q$, which is occupied by a movable bar, $r$, which regulates the feed or the discharge of fertilizer from the hopper.

Having described my invention, I claim and desire to secure by Letters Patent of the United States—

1. A hopper for fertilizer-drills, having, in combination, the wood bottom provided on its upper surface with recesses $d$, and plates C, having feed-holes $b'$ and seated in the said recesses with their top surface flush with the upper surface of the bottom.

2. A hopper for fertilizer-drills, having, in combination, the concaved wood bottom $a$, provided on its upper surface with recesses $d$, curved glass feed-plates C, having feed-holes $b'$ and seated in the said recesses.

3. A hopper for fertilizer-drills, having, in combination, the concaved wood bottom $a$, provided on its upper surface with recesses $d$, curved feed-plates C, having feed-holes $b'$ and seated in the said recesses with their top surface flush with the upper surface of the bottom, and a rock-shaft, G, having agitators I, which vibrate or swing crosswise of the hopper.

4. A hopper for fertilizer-drills, having, in combination, the wood bottom provided on its upper surface with recesses $d$, plates C, having feed-holes $b'$ and seated in the said recesses, and inclined bottom-blocks H, seated on the said wood bottom between each two feed-holes, and having their ends $p$ overlapped on top of the feed-plates.

5. A hopper for fertilizer-drills, having, in combination, the concaved wood bottom $a$, provided on its upper surface with recesses $d$, curved feed-plates C, having feed-holes $b'$ and seated in the said recesses, and blocks H, having a rounded bottom fitted in the concavity of the hopper-bottom and each block provided on top with a high central cross-ridge, $l$, and two surfaces, $m$, which incline from the cross-ridge downward in opposite directions, and placed with their ends $p$ overlapped on top of the curved feed-plates.

In testimony whereof I affix my signature in the presence of two witnesses.

THOMAS R. CRANE.

Witnesses:
 JOHN E. MORRIS,
 JNO. T. MADDOX.